US006431776B1

(12) United States Patent
Tzeng

(10) Patent No.: US 6,431,776 B1
(45) Date of Patent: Aug. 13, 2002

(54) COMPACT KEYBOARD

(75) Inventor: Shu-Wen Tzeng, Chu Pei (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 09/620,361

(22) Filed: Jul. 20, 2000

(51) Int. Cl.$^7$ ................................. B41J 5/08
(52) U.S. Cl. ...................... 400/472; 400/486
(58) Field of Search ..................... 400/472, 475, 400/476, 480, 481, 486; 341/21, 22; 361/679, 680; 345/168, 169, 170, 171, 172; 235/145 R, 145 A, 146

(56) References Cited

U.S. PATENT DOCUMENTS

| | | | | |
|---|---|---|---|---|
| 4,536,160 A | * | 8/1985 | Hatfield | 434/227 |
| 5,124,702 A | * | 6/1992 | van Ardenne | 341/22 |
| 5,485,614 A | * | 1/1996 | Kocis et al. | 361/680 |
| 5,600,313 A | * | 2/1997 | Freedman | 341/22 |
| 5,625,354 A | * | 4/1997 | Lerman | 341/20 |
| 5,694,123 A | * | 12/1997 | Selker et al. | 341/22 |
| D421,976 S | | 3/2000 | Jobs et al. | |
| 6,142,687 A | * | 11/2000 | Lisak | 400/472 |
| 6,174,097 B1 | * | 1/2001 | Daniel | 400/472 |
| 6,190,068 B1 | * | 2/2001 | Chao | 400/472 |

\* cited by examiner

*Primary Examiner*—Andrew H. Hirshfeld
*Assistant Examiner*—Darius N. Cone
(74) *Attorney, Agent, or Firm*—Ladas & Parry

(57) ABSTRACT

A compact keyboard characterized by a novel key arrangement allowing for an overall reduction in the width of the keyboard while retaining a full set of keys standard to a computer and including a numeric keypad. In the compact keyboard of the present invention, the Home and End keys are located on the row of function keys, while the Down, Left and Right arrow keys are nested under the lowermost row of the text entry and numeric keypad sections of the keyboard. This allows the Insert, Delete, Page Up and Page Down keys to be disposed in a single column as opposed to three columns in the keyboard of the prior art.

19 Claims, 1 Drawing Sheet

COMPACT KEYBOARD

BACKGROUND OF THE INVENTION

1. Field of the Invention

The present relates to a compact keyboard. In particular, this invention relates to a novel key layout allowing for a reduction in the overall width of the keyboard.

2. Description of the Related Art

A keyboard device for a computer includes a plurality of Alpha-Numeric keys. A compact keyboard is desirable because it takes up less space on the user's desktop and requires less raw materials to produce. On other hand, computers require a minimum set of keys to allow the convenient operation of hardware and software. Furthermore, the keyboard arrangement must reflect the needs of the user. For example, users who enter numerical data into a computer desire a numeric keypad with numbers and mathematical symbols. In addition, the size of individual keys must meet the needs of the user. A "full-size", key is generally 1.8 cm in width at the base with a relatively smaller width at the top to allow easy touch-typing.

FIG. 1 shows a keyboard of the prior art. The layout of the keyboard is divided into four sections: text entry section 10, navigation section 20, numeric keypad section 30, and function key section 40. Text entry section 10 comprises five rows of keys, wherein the first row is composed mainly of numeric keys and punctuation keys, the second through fourth rows are comprised mainly of alphabetical and punctuation keys, and the fifth row is comprised mainly of the space bar. Tab, Caps Lock, Shift, Control, Alt, and Enter keys are generally disposed on the left and right extremities of rows two through five. On standard keyboards, the alphabetical keys are arranged in the QWERTY pattern. Navigation section 20 includes an upper portion comprised of two rows of three navigation and editing keys, wherein the Insert, Delete, Home, End, Page Up, and Page Down keys are disposed in this area; and a lower portion comprising arrow keys for controlling the motion of the cursor, wherein the Up Arrow is disposed singly in a first row and the Left, Down and Right Arrow are disposed together in a second row. Numeric keypad section 30 includes five rows of numeric and mathematical symbol keys with a calculator like arrangement for easy number entry. Function key section 40 comprises a row of function keys disposed above text entry section 10, navigation section 20, and numeric keypad section 30. Function key section 40 may also include indicators 45 for displaying whether Num Lock, Caps Lock or Scroll Lock are activated.

The keyboard of the prior art is inefficient in terms of space usage. In particular, the navigation section 20 uses a large amount of space, increasing the width of the keyboard and adding cost to the manufacturing process.

SUMMARY OF THE INVENTION

It is therefore an object of the present invention to provide a compact keyboard.

The compact keyboard of the present invention is characterized by a novel key arrangement in which the arrow keys are disposed in an inverted T arrangement with a first of the arrow keys on the top and the remaining three arrow keys on the bottom, wherein the first arrow key is disposed in the lowermost row of the plurality of alpha-numeric keys and the remaining the arrow keys are disposed below the lowermost row of the plurality of alpha-numeric keys. By putting the remaining three arrow keys below the lowermost row of the plurality of alpha-numeric keys, the width of the keyboard can be reduced.

In a preferred embodiment of the invention, a compact keyboard comprising a text entry section, a navigation section, a numeric keypad section, a function key section, and an arrow key section is disclosed. The text entry section comprises an arrangement of keys including five rows of alpha-numeric keys for the entry of text and numbers. The navigation section is disposed adjacent to and between the text entry section and the numeric keypad section and comprises the Insert, Delete, Page Up, and Page Down keys disposed in a single column corresponding to the rows one through four in the Text entry section. The numeric keypad section is disposed adjacent to navigation section, and comprises five rows of alpha-numeric keys for the entry of numbers. The function key section comprises a row of function keys and the Home and End keys, and is disposed above the text entry section, navigation section, and numeric keypad section. The function key section may also include indicators for displaying whether Num Lock, Caps Lock or Scroll Lock are activated. The arrow key section comprises the Up Arrow, Down Arrow, Left Arrow and Right Arrow keys disposed in an inverted T arrangement with the Up Arrow key on the top and the Down Arrow, Left Arrow and Right Arrow keys on the bottom, wherein the Up Arrow key occupies the fifth row of the navigation section between the text entry section and the numeric keypad section and the Down Arrow, Left Arrow and Right Arrow keys are disposed in a sixth row below the lowermost rows of the text entry section and the numeric keypad section. Preferably, the arrow keys are reduced to three quarters the height of the other keys.

The advantage of this embodiment lies reducing the width of the navigation section. This is achieved by moving the rarely used Home and End keys out of the centrally located navigation section and placing them on the function key row, thereby allowing the Insert, Delete, Page Up, and Page Down keys to be arranged in a single column. The arrow keys are arranged such that the Up Arrow is at the bottom of said single column while the Left, Down and Right Arrow are disposed in a row below the lowermost rows of the text entry section and the numeric keypad section. By reducing the height of the arrow keys to three quarters that of the other keys, the additional height of the keyboard is minimal. On the other hand, when this novel arrangement is applied to a keyboard with a standard set of keys of standard size, the width of the keyboard can be reduced from 455 mm to 405 mm.

BRIEF DESCRIPTION OF DRAWINGS

The following detailed description, given by way of examples and not intended to limit the invention to the embodiments described herein, will best be understood in conjunction with the accompanying drawings, in which.

DETAILED DESCRIPTION OF THE INVENTION

The compact keyboard of the present invention is characterized by a novel key arrangement allowing for an overall reduction in the width of the keyboard while retaining a full set of keys standard to a computer and including a numeric keypad.

Figure 1:
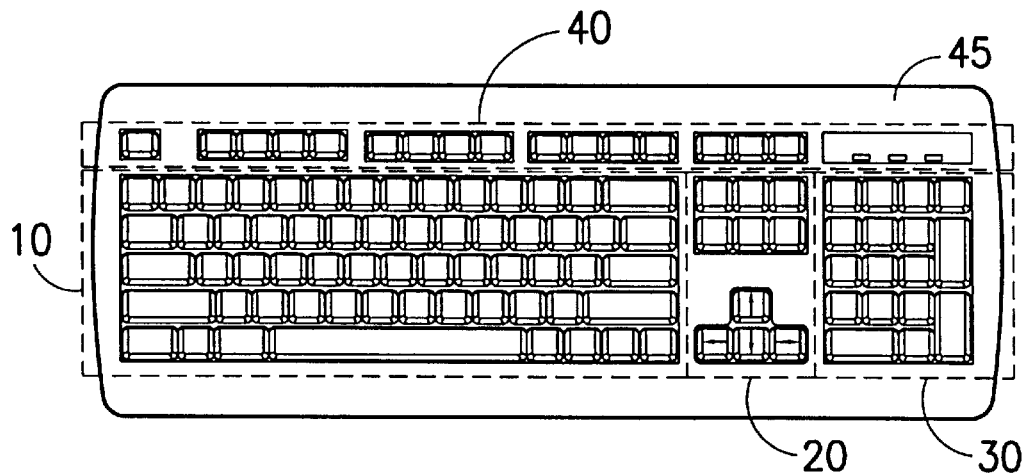
FIG. 1 illustrates a keyboard of the prior art.
Figure 2:
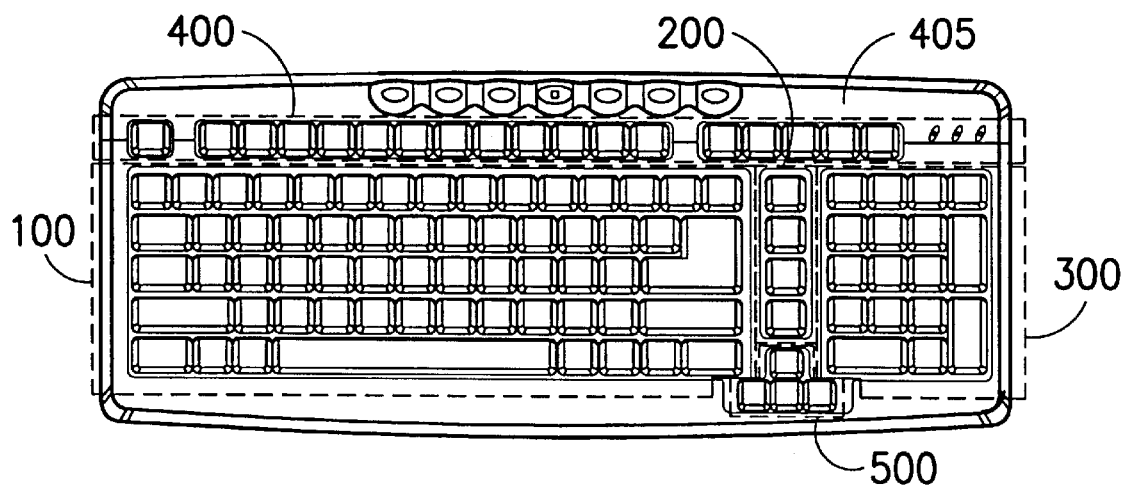
FIG. 2 illustrates a compact keyboard of the present invention.

Please refer to FIG. 2. A preferred embodiment of the compact keyboard of the present invention includes a text entry section 100, a navigation section 200, a numeric keypad section 300, a function key section 400, and an arrow key section 500.

Text entry section 100 comprises an arrangement of keys including five rows of alpha-numeric keys for the entry of text and numbers. The keys are preferably arranged in the standard QWERTY format, wherein the first row is composed mainly of numeric keys and punctuation keys, the second through fourth rows are comprised mainly of alphabetical and punctuation keys, and the fifth row is comprised mainly of the space bar and control keys. Tab, Caps Lock, Shift, Control, Alt, and Enter keys are disposed on the left and right extremities of rows two through five.

Navigation section 200 is disposed adjacent to text entry section 100 and comprises the Insert, Delete, Page Up, and Page Down keys disposed in a single column corresponding to the row one through four in the text entry section. The particular order of the four keys in this section is not limited. Preferably, however, the Page Up key is above the Page Down key and the Insert Key is above the Delete key. Furthermore, navigation section 200 is preferably set off from text entry section 100 and numeric key pad 300 by a small gap. This small gap allows users to visually and tactually differentiate navigation section 200 from adjacent sections without significantly adding to the overall width of the keyboard. The small gap is preferably smaller than the width of a single key.

Numeric keypad section 300 is disposed adjacent to navigation section 200, wherein navigation section 200 is between text entry section 100 and numeric keypad section 300, and preferably comprises five rows of alpha-numeric keys for the entry of numbers.

Function key section 400 comprises a row of function keys and the Home and End keys, and is disposed above text entry section 10, navigation section 20, and numeric keypad section 30. The exact positioning of the Home and End keys is not limited. Optionally, the height of the keys in function key section 400 may be smaller than that of other keys on the keyboard. For example, the keys may be three quarters the height of the other keys on the keyboard. This reduction in size of the function keys does not have a major impact of ease of typing for users because function keys are not generally pressed using touch-typing. Function key section 400 may also include indicators 405 for displaying whether Num Lock, Caps Lock or Scroll Lock are activated.

Arrow key section 500 comprises the Up Arrow, Down Arrow, Left Arrow and Right Arrow keys disposed in an inverted T arrangement with the Up Arrow key on the top and the Down Arrow, Left Arrow and Right Arrow keys on the bottom, wherein the Up Arrow key occupies the fifth row of the navigation section 200 between the text entry section 100 and the numeric keypad section 300 and the Down Arrow, Left Arrow and Right Arrow keys are disposed in a sixth row below the lowermost rows of the text entry section 100 and the numeric keypad section 300. The height of the arrow keys is preferably smaller than that of other keys on the keyboard such that the overall height of keyboard is not significantly increased. For example, the keys may be three quarters the height of the other keys on the keyboard. This reduction in size of the function keys does not have a major impact of ease of typing for users because arrow keys are not generally pressed using touch-typing.

In summary, by moving the rarely used Home and End keys out of the centrally located navigation section and placing them on the function key row, the Insert, Delete, Page Up, and Page Down keys can be arranged in a single column. The arrow keys are arranged in a nested manner such that the Up Arrow is at the bottom of said single column while the Left, Down and Right Arrow are disposed in a row below the lowermost rows of the text entry section and the numeric keypad section. Applied to a keyboard with a standard set of keys of standard size, the width of the keyboard can be reduced from 455 mm to 405 mm. Furthermore, by reducing the height of the arrow keys to three quarters that of the other keys, the additional height of the keyboard is minimal.

While the invention has been described with reference to a preferred embodiment, the description is not intended to be construed in a limiting sense. The novelty of this invention lies in nesting the arrow keys below what would normally be the lowermost row a keyboard of the prior art. It is understood that the layout and content of the text entry section, function key section, navigation and numeric keypad can section can be modified to meet the requirements a particular set of keys. It is not necessary, for example, that the Home and End keys be moved to function key section; other keys could be moved to enable the navigation section to be reduced to a single column. It is therefore contemplated that the appended claims will cover any such modifications or embodiments as may fall within the scope of the invention defined by the following claims and their equivalents.

What is claimed is:

1. A compact keyboard having a full set of keys comprising at least a plurality of alpha-numeric keys disposed in rows;

a numeric keypad section; and an arrow key section between the alpha-numeric keys and the numeric keypad section, the arrow key section comprising an Up Arrow, Down Arrow, Left Arrow and Right Arrow keys disposed in an inverted T arrangement with a first of the arrow keys on the top and the remaining three arrow keys on the bottom, wherein the first arrow key is disposed in the lowermost row of the plurality of alpha-numeric keys and the remaining arrow keys are disposed below the lowermost row of the plurality of alpha-numeric keys so that a compact layout can be achieved for the keyboard with the full set of keys, wherein the plurality of alphanumeric keys includes a navigation section comprising Insert, Delete, Page Up, and Page Down keys disposed in a single column above the first arrow key.

2. The compact keyboard of claim 1, wherein the arrow keys are reduced to three quarters the height of the plurality of alpha-numeric keys.

3. The compact keyboard of claim 1, wherein the first arrow key is the Up Arrow key and the remaining three arrows keys are the Left Arrow, the Down Arrow, and the Right Arrow keys, disposed in that order.

4. The compact keyboard of claim 1, wherein the plurality of alpha-numeric keys includes a text entry section comprising an arrangement of rows of keys for the entry of text and numbers.

5. The compact keyboard of claim 1, wherein the numeric keypad entry section comprising an arrangement keys for the entry of numbers.

6. The compact keyboard of claim 1, further comprising a function key section disposed above the topmost row of the plurality of alpha-numeric keys.

7. The compact keyboard of claim 6, wherein the function key section comprises a row of function keys and includes the Home key and End key.

8. The compact keyboard of claim 6, wherein the function keys are reduced to three quarters the height of the plurality of alpha-numeric keys.

9. A compact keyboard comprising a text entry section, a navigation section, a numeric keypad section, a function key section, and an arrow key section, wherein the text entry section comprises an arrangement of keys including five rows of alpha-numeric keys for the entry of text and numbers; the navigation section is disposed adjacent to and between the text entry section and the numeric keypad section, the navigation section comprising Insert, Delete, Page Up, and Page Down keys disposed in a single column corresponding to the row one through four in the Text entry section; the numeric keypad section comprises five rows of alpha-numeric keys for the entry of numbers; the function key section comprises a row of function keys and Home and End keys, the function key section being disposed above the text entry section, navigation section, and numeric keypad section; and the arrow key section comprises Up Arrow, Down Arrow, Left Arrow and Right Arrow keys disposed in an inverted T arrangement with the Up Arrow key on the top and the Down Arrow, Left Arrow and Right Arrow keys on the bottom, wherein the Up Arrow key occupies the fifth row of the navigation section between the text entry section and the numeric keypad section and the Down Arrow, Left Arrow and Right Arrow keys are disposed in a sixth row below the lowermost rows of the text entry section and the numeric keypad section.

10. The compact keyboard of claim 9, wherein the function key section further comprises indicators for displaying whether Num Lock, Caps Lock or Scroll Lock are activated.

11. The compact keyboard of claim 9, wherein the arrow keys are reduced to three quarters the height of the other keys.

12. The compact keyboard of claim 9, wherein the function keys are reduced to three quarters the height of the other keys.

13. The compact keyboard of claim 9, wherein the navigation section is set off from the text entry section and the numeric keyboard section by a small gap.

14. A compact keyboard comprising:

a text entry section comprising a plurality of alpha-numeric keys for the entry of text, said plurality of alpha-numeric keys arranged in rows;

a numeric keypad section for the entry of numbers;

an arrow key section comprising an Up Arrow, Down Arrow, Left Arrow and Right Arrow keys disposed in an inverted T arrangement with a first of the arrow keys on the top and the remaining three arrow keys on the bottom, wherein the first arrow key is disposed in the lowermost row of the plurality of alpha-numeric keys and the remaining three arrow keys are disposed below the lowermost row of the plurality of alpha-numeric keys; and a navigation section comprising Insert, Delete, Page Up, and Page Down keys arranged in a single column and disposed adjacent to and among the text entry section the numeric keypad section, and the arrow key section.

15. The compact keyboard of claim 14, wherein the single column of Inset, Delete, Page Up, and Page Down keys are disposed above the first arrow key of the arrow key section.

16. The compact keyboard of claim 14, further comprising a function key section disposed above the topmost row of the plurality of alpha-numeric keys.

17. The compact keyboard of claim 16, wherein the function key section comprises a row of function keys and comprises a Home key and an End key.

18. The compact keyboard of claim 16, wherein the function keys are reduced to three quarters the height of the plurality of alpha-numeric keys.

19. The compact keyboard of claim 14, wherein the first arrow key is disposed in a single line with the single column of Insert, Delete, Page Up, and Page Down keys.

\* \* \* \* \*